United States Patent Office 3,388,432
Patented June 18, 1968

3,388,432
APPARATUS FOR AUTOMATICALLY TRANSPORTING AND SUPPLYING LAPS FROM A LAP MACHINE
Toshihiko Saikawa, Takatsuki-shi, Hisashi Kinoshita, Moriguchi-shi, and Akira Ando, Ikeda-shi, Japan, assignors to Kureha Spinning Co., Ltd. and Fuji Iron Works Co., Ltd., Osaka, Japan, both corporations of Japan
Filed Oct. 12, 1964, Ser. No. 405,327
Claims priority, application Japan, Oct. 11, 1963, 38/54,340; Mar. 27, 1964, 39/16,754; Mar. 28, 1964, 39/17,039
5 Claims. (Cl. 19—65)

This invention relates to a method of automatically transporting and supplying to the comber side a comber lap which, after having been wound up in a lap machine, has been doffed therefrom. The invention also relates to the automatic comber lap transporting apparatus by which the foregoing method is accomplished, the apparatus comprising, in combination, a lap receiving apparatus which, being disposed at a location where a full lap is automatically discharged from an automatic doffing apparatus-equipped lap machine and being capable of shifting in front of said machine transversely thereof for a distance equal to the width of the lap per shift, receives said lap, a plurality of lap carriers provided so as to travel constantly over a rail disposed endlessly in such a fashion as to pass over the point where the lap is discharged and thence above the several combers of a gang thereof, a lap lifting apparatus adapted to lift the discharged laps from the foregoing lap-receiving apparatus to said carriers, and lap feeders provided in the several combers and adapted to receive the laps transported by the carriers and feed the laps to the combers.

Heretofore, when a lap was doffed from the lap machine, it was loaded manually onto a handcart for laps until a certain number of laps was loaded, after which a worker pushed this cart to where the gang of combers was located and, as required, loaded the laps on the lap creel of the combers and readied the laps for use in the next operation. Again, though the transportation of the lap was mechanized, in this case what was mechanized was only the transportation portion of the operation, the lap doffed from the lap machine being loaded onto the lap carrier by hand and also unloaded and supplied at the gang of combers by hand. Thus, there was not much difference between the former and the latter in that the loading and unloading of the laps were carried out essentially by hand.

On the other hand, since according to the present invention the loading as well as unloading operations are all carried out automatically, these operations can be carried out without the need for any manual effort at all, with the consequence that a great saving in labor requirements is made possible. Further, as these operations of loading, transporting and unloading are carried out completely mechanically in accordance with an established method without the intervention of human hands, the damage to the lap is minimized and as a result favorable effects are also had on the quality of the product. In addition, because the flow of the products between the processing steps is made smooth, the running stock is reduced and as a result good results are had in lowering the cost of production.

An object of this invention is to provide a method and apparatus whereby full laps doffed from the lap machine are transported to the combers and supplied thereto in a fully automatic manner. Another object is to provide a method and apparatus whereby the full lap which is to be supplied to a lap carrier, after having been doffed from the lap machine, is brought into proximity with said carrier. A still further object is to provide a method and apparatus for loading the aforesaid lap onto the lap carriers. A further object is to provide a method and apparatus by which the foregoing lap carrier transports the lap while holding it. An additional object of the invention is to provide a method and apparatus by which the lap held by the lap carrier is unloaded onto a comber by being released and dropped from the lap carrier.

As is apparent to those skilled in the art from the foregoing and other objects, the gist of the present invention resides in a combination of the various parts as described herein and comprehended by the appended claims.

The features of the present invention will be understood by reference to an embodiment thereof as illustrated in the accompanying drawings, wherein.

Outline

Figure 1:
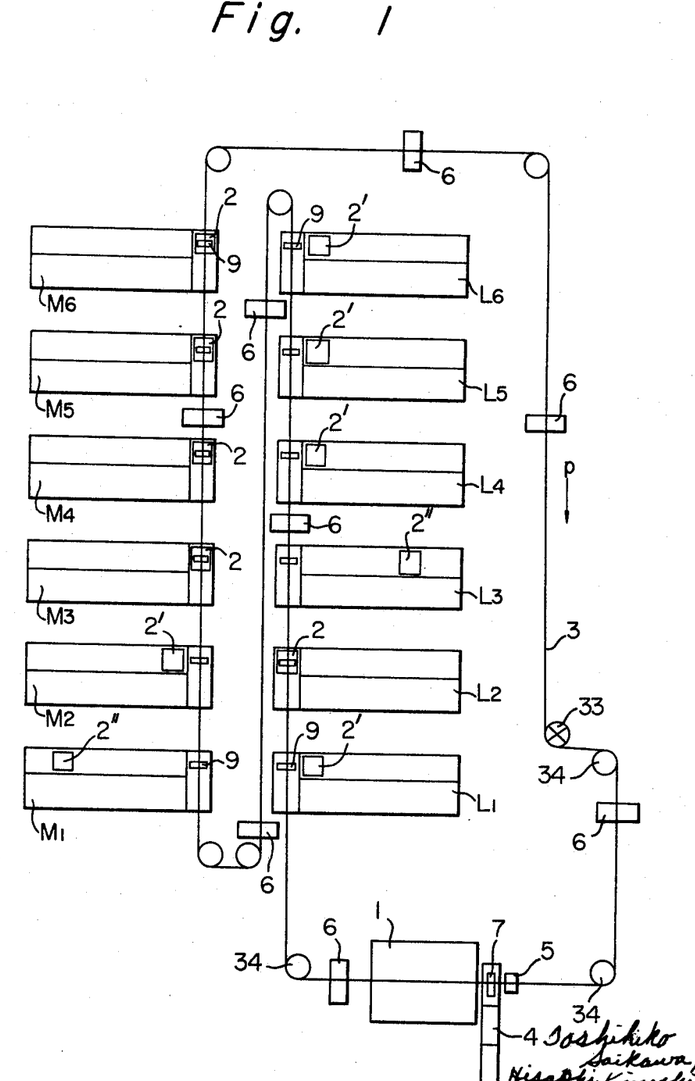
FIG. 1 is a plan view illustrating an over-all setup of the method and apparatus according to the invention.

Referring to FIG. 1, an embodiment of the present invention will be described relative to the operation of supplying to a gang of combers $L_1$, $L_2$ . . . $L_6$, $M_1$, $M_2$ . . . $M_6$ full laps doffed from an auto-doffing apparatus-equipped lap machine. In front of lap machine 1 and extending transversely to the lap doffing direction of said machine is disposed a lap receiving apparatus 4 which is capable of shifting horizontally at every shifting operation a distance equal to the width of the lap, while a lap lifting apparatus 5 is disposed on the opposite side of the lap receiving apparatus from the lap machine. Above the machine 1 and apparatus 4 is disposed an overhead endless rail 3 which passes above the machine and apparatus and thence above one side of the line of combers. Lap carriers 6 are disposed at given intervals along rail 3 so as to be capable of traveling in the direction P. When an empty carrier which is traveling over rail 3 approaches the lap lifting apparatus 5, the lap discharged from lap machine 1 onto lap receiving apparatus 4, while being carried by the lap cradle plate, is lifted by means of the lap lifting apparatus up towards the rail where it awaits the arrival of the carrier. The empty carrier while continuing its travel clasps the raised-up lap and then continues its movement in the same direction and travels along the line of combers ($L_1$, $L_2$ . . . $L_6$) and ($M_1$, $M_3$ . . . $M_6$). The several combers are each provided with a lap feeder 2 for supplying laps to the combers, the lap feeder being so mounted as to be capable of reciprocative movements over a different set of rails in alignment with the deliveries of the combers. The feeder, when not loaded with a lap, is adapted to move to a position directly below rail 3 and stand by for receiving a lap. When lap carrier 6 which is clasping a lap and traveling along rail 3 passes above feeder 2, which is standing by, it releases the lap onto said feeder and then continues its travel about the same course.

*Lap receiving apparatus*

Figure 2:
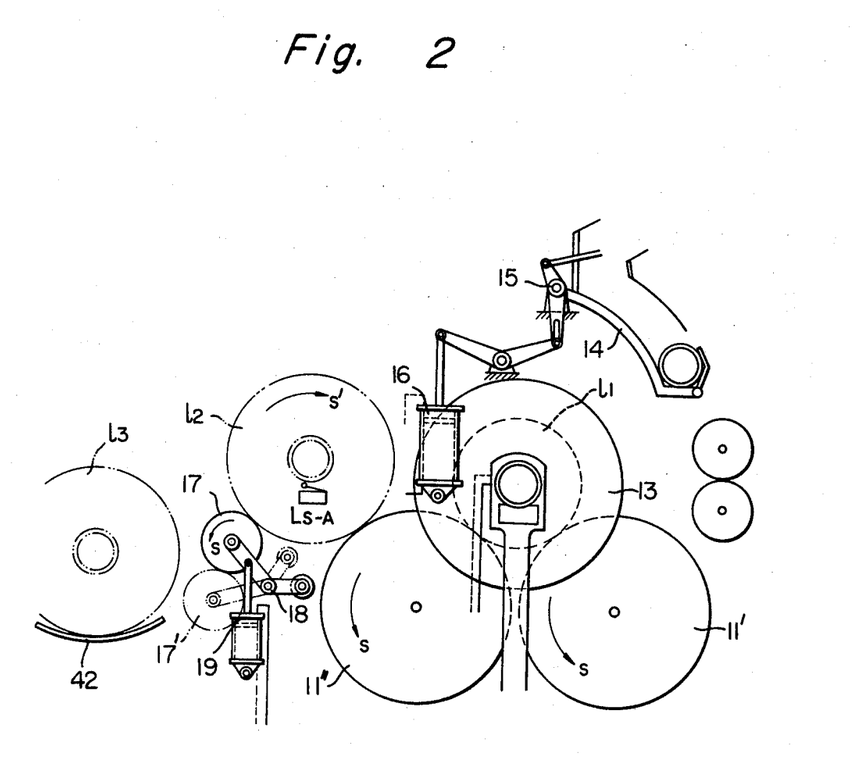
FIG. 2 is a schematic elevation illustrating the automatic doffing mechanism of a lap machine.

The lap machine from which the lap is discharged onto the lap receiving apparatus is preferably one equipped with an autodoffing apparatus such as the lap winding machine of our copending application Ser. No. 257,963, now Patent No. 3,239,155. The general operation of this machine will be described with reference to FIG. 2. When lap $l_1$ which is being wound above lap rollers 11', 11" while being clasped by means of a pair of lap disc plates 13 becomes full size by having attained its prescribed length, the lap disc plates rise and the group on the full lap is released by said disc plates opening to both sides. Then a spool supplying device 14 disposed to the rear and holding a new spool is rotated clockwise about shaft 15 by means of piston 16 whereby lap $l_1$ which has become full size is pushed out into a position between the front lap roller 11" and auxiliary roller 17 which is in its elevated position to become lap $l_2$, where its winding up is continued until its severed tail end is wound up. Auxiliary roller 17 then descends about shaft 18 as a result of the descent of piston 19, with the consequence that lap $l_2$ is discharged onto cradle plate 42 of the lap receiving apparatus to become lap $l_3$.

Figure 3:
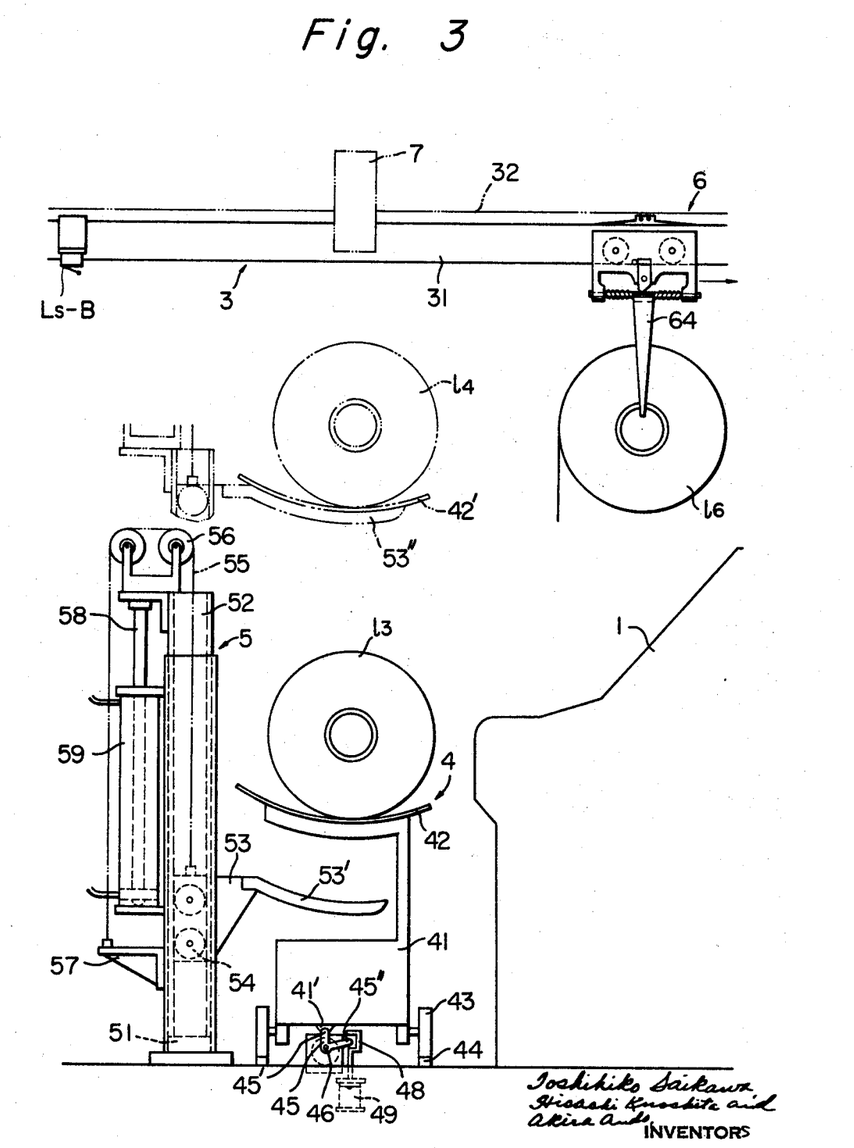
FIG. 3 is a side view showing the construction of the lap receiving apparatus and lap lifting apparatus.
Figure 4:
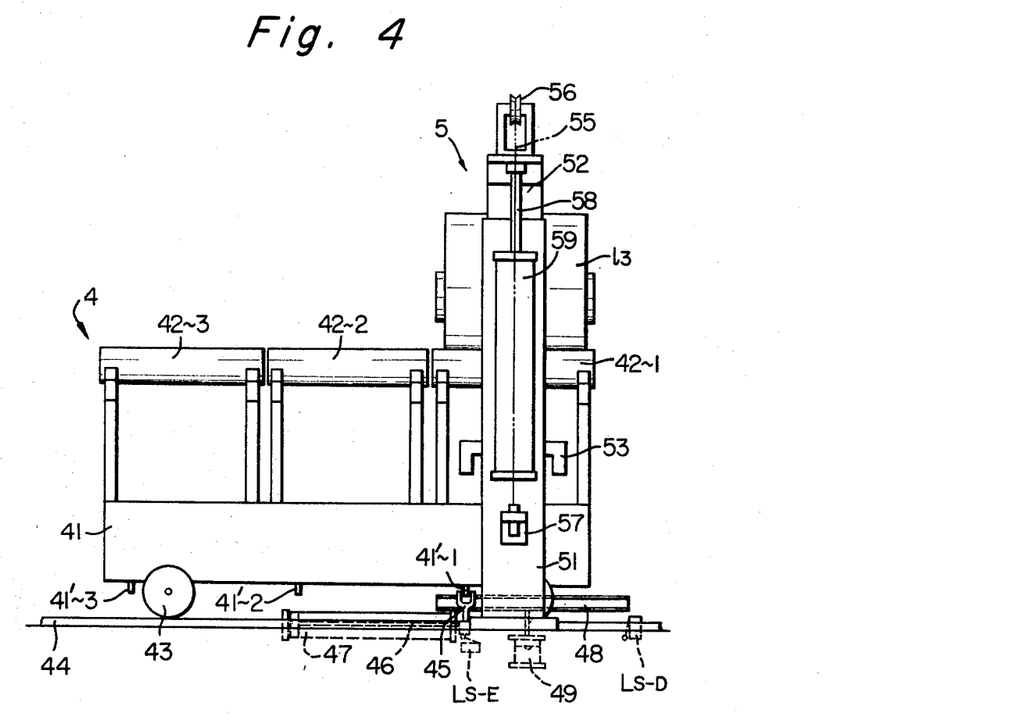
FIG. 4 is a front elevation illustrating the construction of the lap receiving and lap lifting apparatus.

The lap receiving apparatus, as shown in FIGS. 3 and 4, consists of a lap traverser 41, rails 44 over which said traverser traverses and means for effecting the traverse of the traverser. Provided above lap traverser 41 are a plurality of cradle plates 42 (in the drawing indicated as 42–1, 42–2 and 42–3 depending upon their position) upon which the laps are to be loaded. The cradle plates are designed so that projections provided perpendicularly on the underside of the cradle plates fit into recesses (not shown) in the top of traverser 41 thereby rendering the cradle plates readily detachable upwardly but precluding their shifting horizontally. Further, the supporting members of the cradle plate are mounted cantilever fashion on the upright portions of the projections to ensure that they do not become a hindrance to the hereinaftermentioned fork 53'. In addition, at the bottom of lap traverser 41 are provided wheels 43 whereby the traverser is capable of moving freely over rails 44 installed on the floor in such a fashion as to cross the front of the lap machine at right angles. As to the means for effecting the traverse of the traverser, there is provided a hydraulic cylinder 47 which is secured between rails 44 on the floor in parallel with said rails, the distal end of piston rod 46 which makes sliding movements in said cylinder 47 being loosely provided with an L-shaped lever whose tip 45', being bifurcated, is in engagement with dog generally indicated at 41' secured to the underside of traverser 41. Tip 45" of the lateral piece of lever 45 fits loosely in a sliding guide 48 and is slidable therein. Sliding guide 48 has a length equal to that of the stroke of piston rod 46 and its underside is secured to the top end of a piston rod of a hydraulic cylinder 49 which is mounted perpendicularly. When sliding guide 48 is in its raised position, then tip 45' of L-shaped lever 45, as shown in FIG. 3, is in engagement with dog 41'. When piston rod 46 makes a sliding movement axially in this state, the lap traverser 41 is caused to move over rails 44 in the direction in which said piston rod moves for a distance equal to that of the stroke of the piston. On the other hand, when sliding guide 48 is at its lowered position, tip 45' of L-shaped lever 45 is turned about piston rod 46 as a pivot and is disengaged from dog 41', with the consequence that lap traverser 41 does not move, even though piston rod 46 makes a sliding movement. Further, since the plurality of cradle plates 42–1, 42–2, 42–3 . . . are juxtaposed at prescribed intervals sufficient to accommodate the several laps and the stroke of cylinder 47 is also equal to the width of the cradle plates or the lap, the lap traverser 41 moves an amount equal to a single cradle plate upon each actuation of said cylinder 47. Further, dogs 41' are also provided in corresponding positions on the several cradle plates. Now, when by applying hydraulic pressure to cylinder 49 so as to push the piston rod up sliding guide 48 is placed in its raised position, if hydraulic pressure is applied to cylinder 47 so as to push piston rod 46 outwardly, the lap traverser 41 moves over rails 44 traversely for a distance equalling the length of the stroke of piston rod 46, i.e., equal to the width of one cradle plate, since lever tip 45' moves while in engagement with dog 41'–1 which corresponds to cradle plate 42–1. Next, if, prior to the time piston rod 46 is retracted, the hydraulic pressure to cylinder 49 is changed to lower the piston and sliding guide 48 is placed in its lowered position, lever tip 45' is disengaged from dog 41'–1, the piston rod 46 and lever 45 retract independently of the lap transverser 41, and as a result, the lap traverser remains in position where it had been moved a distance equal to the width of just one cradle plate. When cylinder 47 reverts to its original position and piston rod 46 and lever 45 reach their end point, if sliding guide 48 is again raised by changing the direction of the hydraulic pressure applied to cylinder 49, tip 45' comes into engagement with dog 41'–2 which corresponds with the next cradle plate.

*Lap lifting apparatus*

Figure 5:
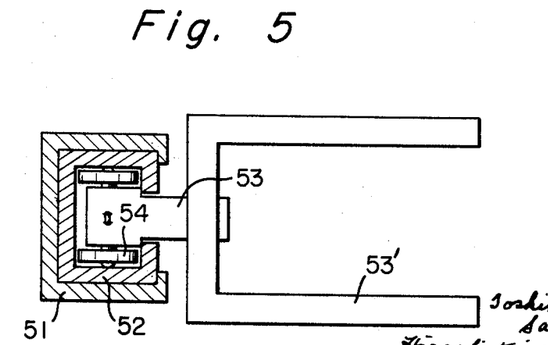
FIG. 5 is a cross-sectional view showing the construction of the support of the lap lifting apparatus.

The lap lifting apparatus, as illustrated in FIGS. 3, 4 and 5, comprises a base stand 51 secured to the floor and standing perpendicularly, a sliding stand 52 which slides up and down in said base stand, a sliding block 53 which, in turn, slides up and down in said sliding stand 52 and having rollers 54 on both sides thereof, a roller chain 55 whose one end is attached to said block 53 and whose other end is attached to a bracket 57 secured to a lower part of base stand 51 over guide wheels 56 provided at the top of sliding stand 52, and a piston rod 58 which makes sliding movements in a hydraulic cylinder 59 and is attached by way of a bracket to the top of sliding stand 52. Further, the tip of sliding block 53 is in the form of a fork 53' which is adapted to be inserted under one of the aforesaid cradle plates to lift it upwardly. When hydraulic pressure is applied to cylinder 59 from its underside, sliding stand 52 rises by way of piston rod 58 a distance equal to its stroke length. Further, since rotatable guide wheels 56 are provided at the top of sliding stand 52 and roller chain 55 which is guided over said guide wheels is secured at its one end to bracket 57 while its other end is connected to sliding block 53, when sliding stand 52 is raised by means of hydraulic pressure, sliding block 53 also slides upwardly in sliding stand 52. Hence, sliding block 53 rises with respect to base stand 51 a height equal to twice the stroke length of piston rod 58. In order to ensure that the cradle plate 42 does not make unstable movements on the fork 53' when it is lifted by the fork is provided a plurality of small projections on the underside of the cradle plate at suitable locations coming in contact with the surface of fork 53' and it is desirable that these projections fit into the top surface of the fork.

*Lap carrier*

Figures 6, 7:
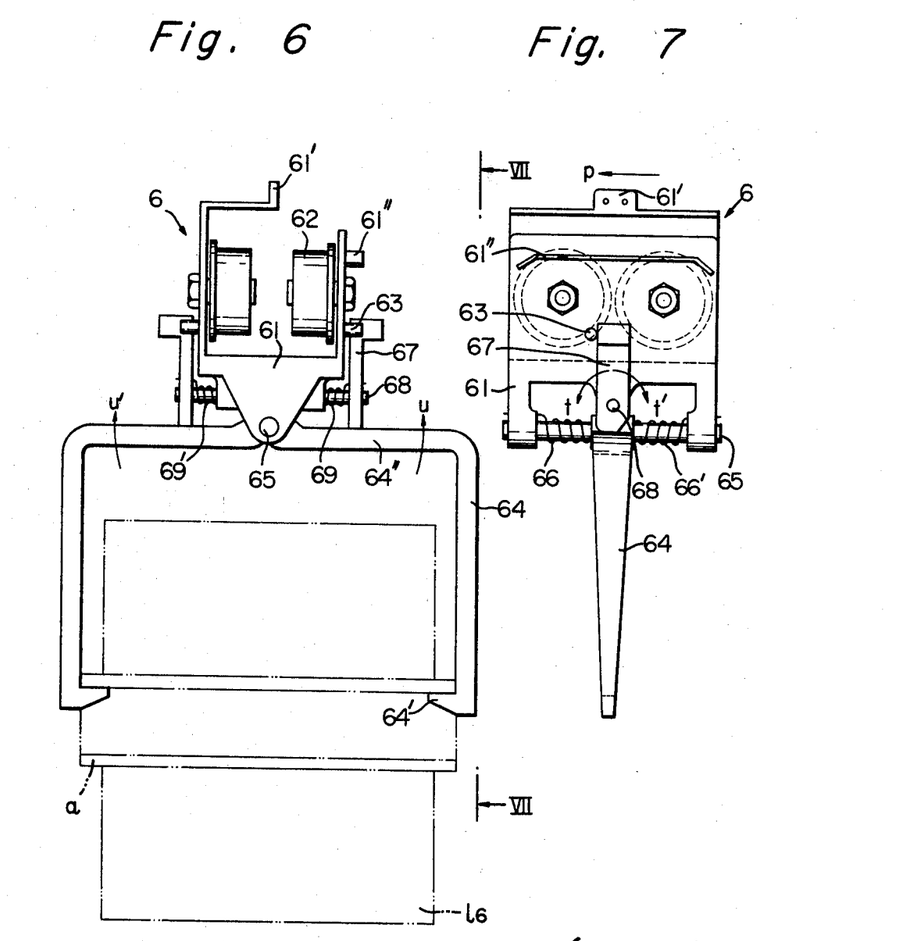
FIG. 6 is an elevation illustrating the construction of the lap carrier.
FIG. 7 is a side view of said lap carrier as seen from the direction VII—VII of FIG. 6.
Figure 8:
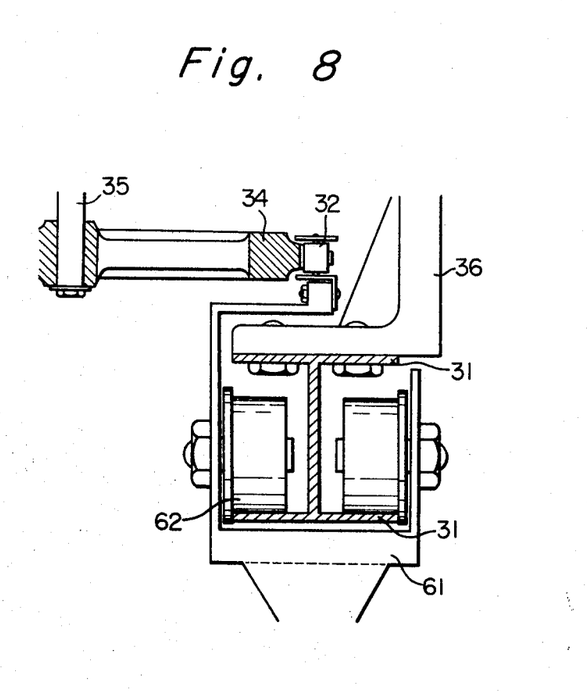
FIG. 8 is a vertical sectional view of that part where the lap carrier hangs in a rail.

The several lap carriers 6, as shown in detail in FIGS. 6 and 7, and shown in detail how they are suspended from rail 31, in FIG. 8, comprises an upper part provided with carrier wheels 62 which travel on rail 31 of I section and a lower part, the lap clasping part, which consists of a pair of symmetrical downwardly extending hooked arms 64 pivotally mounted so as to be spreadable about a shaft 65 disposed longitudinally of the direction of travel of the lap carriers. Provided around shaft 65 which is disposed at the lower central part of carrier body 61 are springs 66 and 66' which normally exert a biasing action on the hooked arms 64 in the directions of arrows $u$ and $u'$, i.e., to open hooked arms 64. Further, above shaft 65 and at right angles thereto is provided another rotatable shaft 68 which has secured at both ends thereof rotating levers 67, the bottom ends of which levers press against the shoulder portions 64" of hooked arms 64. Levers 67 also have springs 69 and 69' mounted around shaft 68 which exert biasing actions to keep levers 67 turned normally towards the direction which is the same as that of the travel of carrier body 61, i.e., in direction $t$. In addition, on body 61 at a point near the upper part of levers 67 on the side towards which the carrier travels there are provided fixed projections 63 by which levers 67 are blocked from turning in the direction $t$ beyond their perpendicular position. Thus, if rotating levers 67 are turned in direction $t'$ against the biasing actions of springs 69, 69', the pressure of levers 67 against the top of shoulder portions 64" of the hooked arms is relaxed, and the hooked arms 64 are turned in directions $u$ and $u'$ by means of the biasing actions of springs 66 and 66', respectively, to spread the tips 64' of the hooked arms. Then if the two hooked arms are both closed at the same time against the biasing actions of springs 66, 66' by means of an external force, the rotating levers 67 which had been in an inclined position turn back towards the direction $t$ by means of the biasing actions of springs 69, 69' until they hit the projections 63 and assume their upright position. Even though the external force is thereafter removed from the hooked arms 64, they remain closed, and even though hooked arms 64 have an external force applied thereto with the intent of opening them, arms 64 do not open so long as levers 67 are not turned in direction $t'$ positively, because levers 67 are in a locked position. Hence, lap $l_6$ is not released and dropped accidentally during the time it is being transported. Again, when necessary, lap $l_6$ can be released by turning levers 67 downwardly from their upright position.

Lap carrier 6 is suspended from rail 31 by way of carrier wheels 62 which have been mounted rotatably on the upper part of body 61. Above rail 31 and centrally thereof (FIG. 8) a roller chain 32 is mounted facing in a sidewise direction, to a specific link of which chain is fixedly secured a projecting portion 61' of an upper end of one side of carrier body 61. Rail 31 is supported by brackets 36 that are secured to its upper side, which brackets are of such a configuration that they do not hinder the travel of carrier body 61. Chain 32 is, on the other hand, mounted on guide wheels 34 loosely fitted on shafts 35 and provided at each point of directional change of the course. Thus, the chain is mounted so as to travel along the rail at all times. One or more electric motor-driven driving wheels 33 are provided in this course, and thus with roller chain 32 being driven by said wheels 33 the lap carriers 6 are caused to travel along rail 31. Further, a projection 61" at the upper side of one side of body 61, as hereinafter described, serves as the contactor for limit switches to be operated during the travel of the lap carriers.

*Lap clasping apparatus and lap releasing apparatus*

Figure 9:
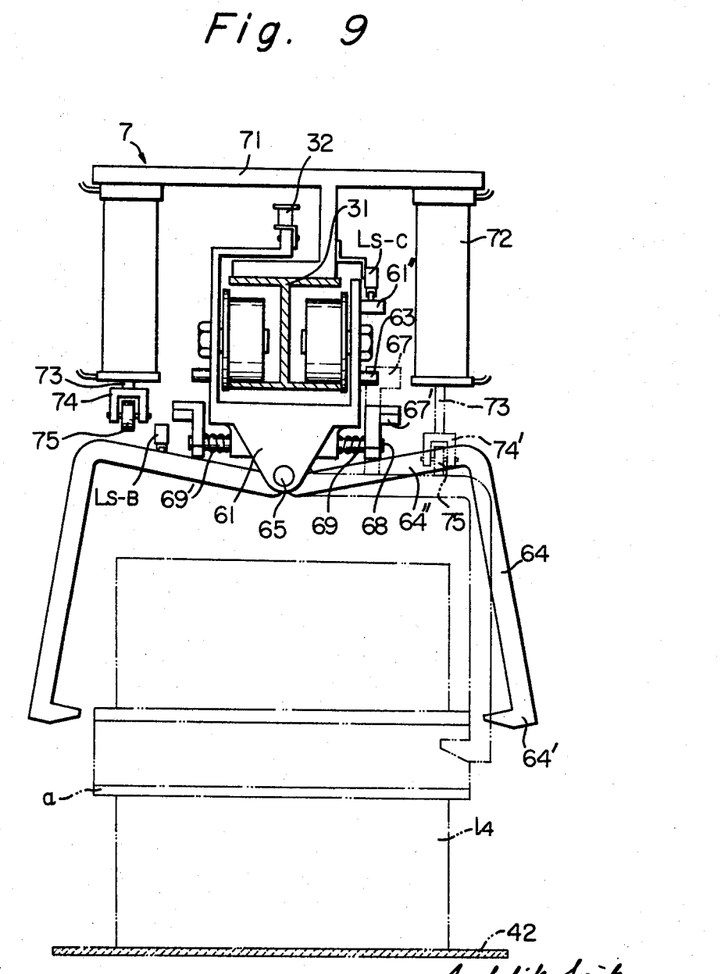
FIG. 9 is a front elevation showing the construction of the lap clasping apparatus.

The lap clasping apparatus 7 (see FIG. 1), whose construction is shown in FIG. 9, straddles rail 31 directly above the lap receiving apparatus. To the upper side of carrier rail 31 is secured a bracket 71 having a configuration such that it does not hinder the travel of lap carrier 6. Hydraulic cylinders 72 are attached symmetrically to the upper part of bracket 71 which extends outwardly over both sides of rail 31. Cylinders 72, which face downwardly, have piston rods 73 to the distal ends of which are secured brackets 74 fitted with rotatable rollers 75. As shown in the figure, if piston rods 73 are thrust out simultaneously in the downward direction when hooked arms 64, in the open or spread position, pass below said apparatus, rollers 75 press downwardly on the shoulder portions 64" of hooked arms 64 and, as previously described, turn the hooked arms inwardly, with the consequence that hooks 64' clasp spool $a$ of lap $l_4$.

Figure 10:
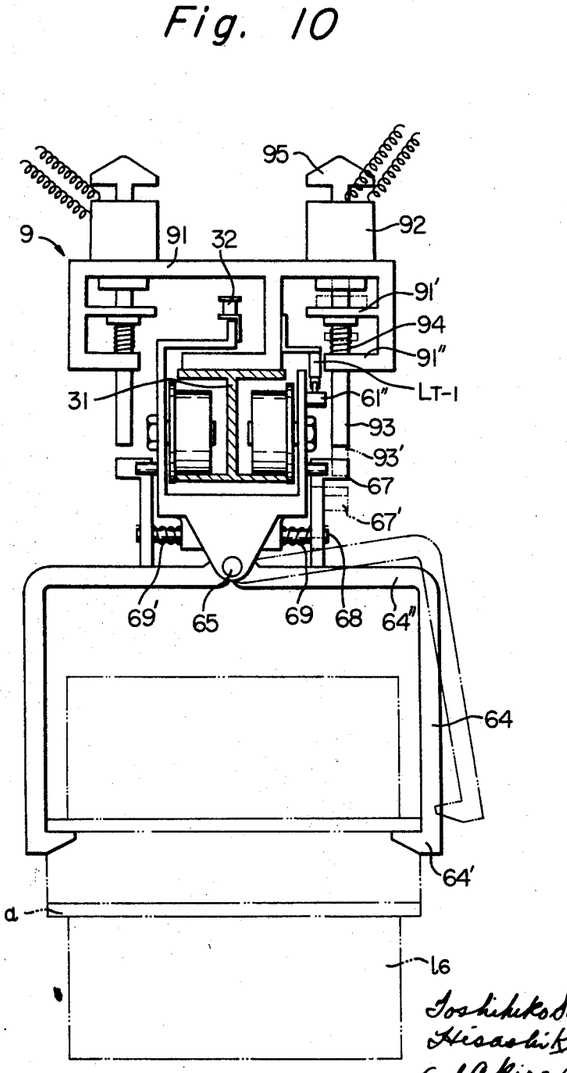
FIG. 10 is a front elevation illustrating the construction of the lap releasing apparatus.

Along the carrier rail and above the several lap feeders are disposed lap releasing apparatuses 9 (see FIG. 1), the construction of one of which is shown in FIG. 10. Bracket 91 having a configuration such that it does not hinder the travel of lap carriers 6 is secured to the upper side of carrier rail 31. To the upper part of this bracket which extends outwardly over both sides of rail 31 are attached in symmetrical positions with respect to the rail a pair of electromagnets 92. Moving cores 95 which pass through the center of said electromagnets have affixed to their bottom ends downwardly facing rods 93 which are guided by the end portions 91', 91" of bracket 91. Rods 93 and cores 95 are normally urged upwardly by means of the biasing action of springs 94. When lap carrier 6 passes by, limit switch $L_{T-1}$ is operated by switch contractor 61" of said carrier whereby both electromagnets 92 are energized and the cores 95 are attracted, with the consequence that both rods 93 are depressed against the biasing action of their springs 94 to the dotted line position 93'. Hence, the heads of turning levers 67 of the lap carrier passing under the lap releasing apparatus collide with rods in the position 93' and by being turned in direction $t'$ move to the position shown by dotted line 67'. In consequence, the pressure against shoulder portions 64" of hooked arms 64 is released whereby hooks 64' are opened by the biasing action of springs 66, 66', and the lap which had been carried by the hooks is dropped. Then, as lap carrier passes beyond the releasing apparatus, limit switch $L_{T-2}$ is pressed by switch contactor 61" to de-energize the electromagnets 92 and cause rods 93 to revert to their original position.

Figure 13:
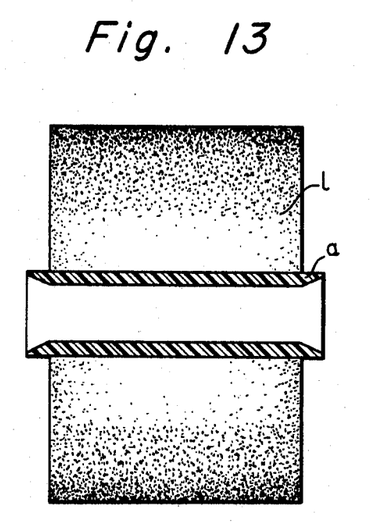
FIG. 13 is a view in section of lap wound up on a spool as used in this invention.

Since the hereinbefore described lap carrier grasps the lap-wound spool with two hooked arms 64, in order to preclude damage to the side faces of the lap by the hooked arms, preferably there is used a spool whose two ends project beyond the side faces of the lap. A configuration of such a spool is shown in FIG. 13.

*Electric circuit*

Figure 11:
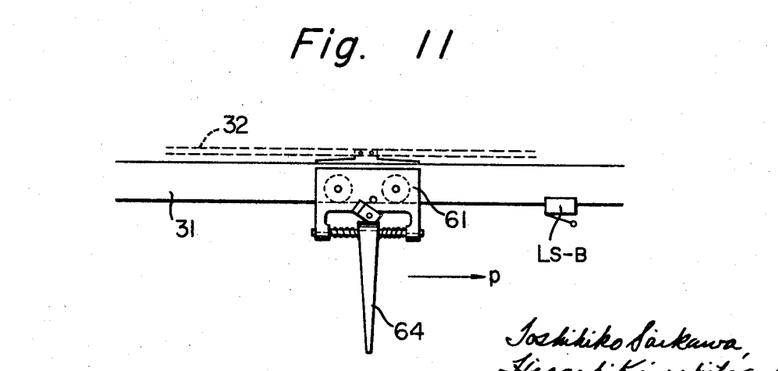
FIG. 11 is a view showing where limit switch $L_{S-B}$ is installed on the rail.
Figure 12:
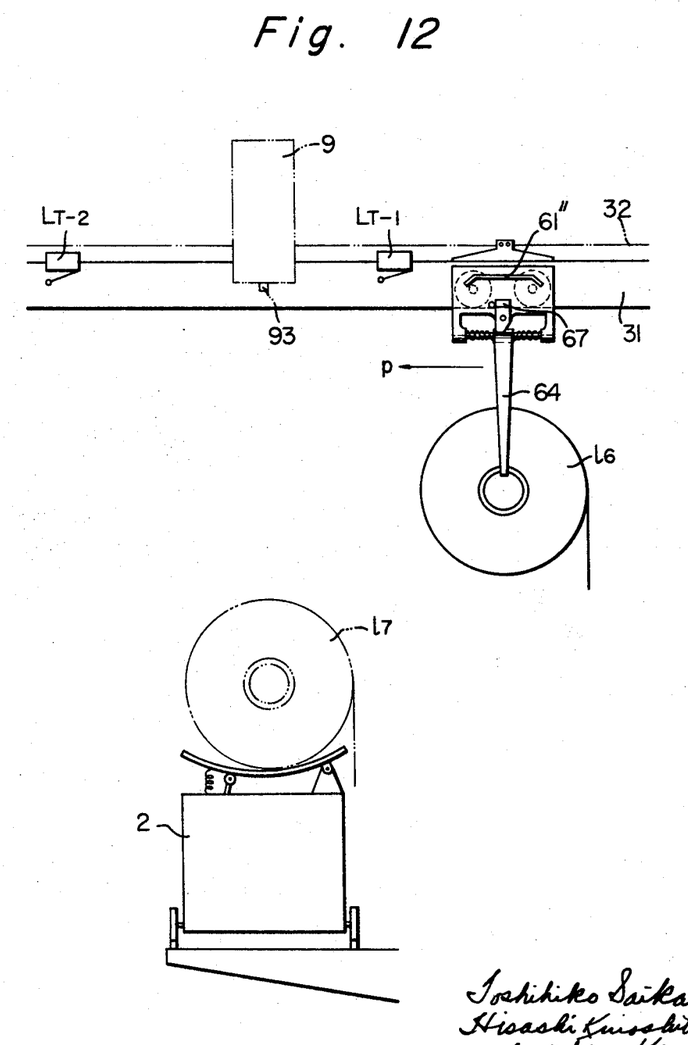
FIG. 12 is a side view illustrating the relationship between the carrier lap releasing apparatus and the lap feeding apparatus.
Figure 14:
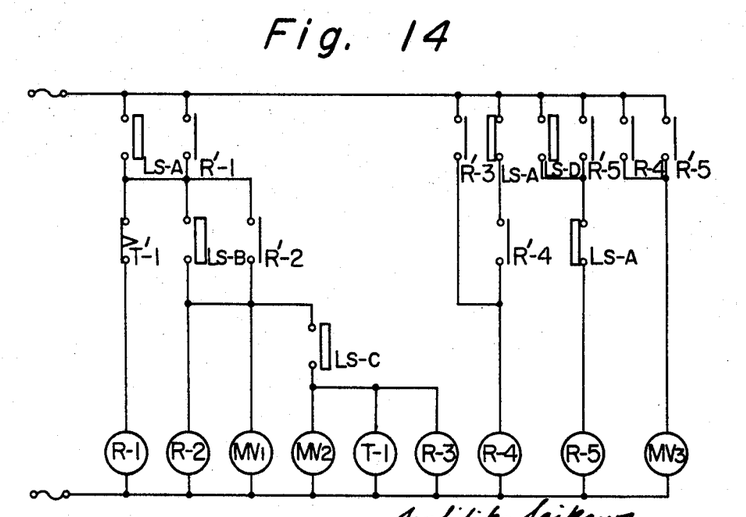
FIG. 14 is an electric circuit diagram for the apparatus of the invention.

FIG. 14 illustrates an electric circuit by which the lap removing apparatus 4, the lap lifting apparatus 5 and the lap clasping apparatus 7 are made to function cooperatively. Since limit switch $L_{S-A}$ is provided in lap machine 1 so as to be pressed by the end of spool $a$ of a full lap $l_1$ when it is pushed out onto auxiliary roller 17, this switch accomplishes the detection of the doffing of the full lap. When limit switch $L_{S-A}$ is momentarily turned on, relay R-1 is energized to close contact R'-1, thus indicating that the doffing has been completed. Limit switch $L_{S-B}$, as shown in FIGS. 3, 9 and 11, is provided on the rails 3 of the lap transporting course at a point somewhat in advance of the location of lap lifting apparatus 5 and in such a fashion that it will be pressed by a raised shoulder 64" on the raised hooked arms. When it is thus switched on, relay R-2 is energized to close contact R'-2 only when contact R'-1 is closed. Simultaneously, electromagnetic valve $MV_1$ for operating cylinder 59 is energized to change the direction of the hydraulic pressure, with the consequence that piston rod 58 is pushed up to operate the lap lifting apparatus. Then when limit switch $L_{S-C}$ of FIG. 9, which is provided at the lap clasping position, is turned on by contactor 61" of carrier body 61, electromagnetic valve $MV_2$ for operating cylinder 72 is energized to change the direction of the hydraulic pressure, with the consequence that piston rod 73 is depressed to operate the lap grasping apparatus. At this same time, relay R-3 and time delay relay T-1 are also energized, while relay R-4 is also energized by contact R'-3 to close contact R'-4, thereby energizing the electromagnetic valve MV₃ for operating cylinder 49. The direction of the hydraulic pressure of cylinder 49 is changed by valve MV₃ having been energized, and sliding guide 48 descends, with the consequence that lever tip 45' slips out from dog 41'-1. Thereafter, even though relay R-3 is deenergized, the energization of MV₃ continues until relay R-4 is deenergized by limit switch $L_{S-A}$ being pressed by the next doffing action. On the other hand, when time delay relay T-1 passes the set time, contact T'-1 is opened to open the circuits on the left side inclusive of relay R-3. In consequence, the lap lifting apparatus descends and piston rod 73 of the clasping apparatus rises, both reverting to their original positions. At this time, in the case a lap is not transferred to the lap carrier from the lap receiving apparatus (the lap carrier having passed over the lap receiving apparatus while still carrying a lap) the circuits on the left side inclusive of relay R-3 will not be closed. Hence relay R-4 not being energized, contact R'-4 will remain open and, as a result, electromagnetic valve MV₃ will not be energized, with the consequence that lever tip 45' continues to be engaged with dog 41'-1 and thus the lap receiving apparatus is shifted for just one stroke laterally along with the movement of piston rod 46. However, when piston rod 46 reaches the end of its stroke, since limit switch $L_{S-D}$ is closed thereby, the relay R-5 circuit is closed by it and limit switch $L_{S-E}$ which is closed with the movement of the piston rod. Thus, electromagnetic valve MV₃ is energized by contact R'-5 closing, with the consequence that lever tip 45' disengages from dog 41'-1 to leave the lap receiving apparatus where it stands when the piston rod reverts to its original position.

As hereinbefore described, the lap transporting method and the apparatus therefor of the present invention comprising a lap receiving means, lap lifting means, lap clasping means, lap carrying means and lap releasing means, by maintaining close relationship between the several means, makes it possible to carry out completely automatically, without the requirement for manual labor and the difficulties such as troubles ascribable to the intervention of said means, and further in a most effective and efficient manner, the transporting and supplying to a gang of combing apparatuses comber lap produced by a lap machine and automatically doffed therefrom. Moreover, the invention makes possible a reduction in production costs as a result of not only a reduction in labor requirements, the most important effect of the invention, but also an increase in the flow of the products between the processing steps and a reduction in running stock. In addition, since the make-up of the apparatus is not complicated, it can be installed at low cost, and as its construction is not such as to cause breakdowns, its management is highly simplified to yield great results from the economical standpoint. Further, it possesses great adaptability in that it can be operated manually with comparable efficiency as in the case of its fully automatic operation. Thus, taken together with its make-up and ease of operation, it is very practical. Further, good results are also obtainable with respect to the quality of the product, because the number of treatments that the lap is subjected to after having been doffed from the lap machine is less than in the case of the conventional method of transporting the laps manually or semi-mechanically and also because such treatments as would disturb the lap surface are avoided as much as possible.

It is to be understood that the invention is not restricted to the embodiment thereof illustrated and described, and that the details of construction may be modified and rearranged in accordance with the spirit and scope of the invention.

What is claimed is:
1. An apparatus for automatically transporting and supplying laps from a lap machine having an automatic lap doffing apparatus associated therewith to a gang of side by side combers, said apparatus comprising, in combination, a lap receiving apparatus disposed on the output side of said automatic doffing apparatus and movable horizontally and transversely to the lap-doffing direction, said lap receiving apparatus having lap carrying cradle plates detachably mounted thereon, a lap lifting apparatus disposed on the opposite side of the lap receiving apparatus from said lap machine and including means to lift the cradle plates of said lap receiving apparatus one at a time, an endless overhead rail disposed in a closed loop passing above said lifting apparatus and thence along and on the intake side and above the gang of combers, a plurality of lap carriers hung from and movable along said overhead rail at intervals and each having a pair of hooked arms depending therefrom for grasping a lap, said arm being movable between a spread and a lap grasping position, carrier driving means for driving said carriers along said rail, means actuated by a carrier without a lap therein approaching the point above the lifting apparatus for raising the cradle plate lifting means, and an arm actuating apparatus positioned above said lap lifting apparatus and straddling the rail along which the lap carriers travel, said arm actuating means including means engaged by said hooked arms when they are in the spread position and moving them to the lap grasping position as said carrier moves along said rail immediately over a raised lap.

2. An apparatus as claimed in claim 1 further comprising a plurality of lap releasing apparatuses one positioned above each lap feeder and straddling the rail over which the carriers travel, said releasing apparatuses including means for spreading the hooked arms on said carriers from the grasping to the spread position for releasing a grasped lap.

3. An apparatus as claimed in claim 1 wherein said lap receiving apparatus comprises a traverser movable transversely and horizontally in front of the automatic lap doffing apparatus, traversing means coupled to said traverser for moving said traverser transversely, said traverser having the cradle plates in a line thereon, said traversing means moving said traverser transversely for a distance equal to the width of a cradle plate.

4. An apparatus as claimed in claim 1 wherein said lap lifting apparatus comprises a base stand, a sliding stand which slides vertically within said base stand, and a sliding block which slides within said sliding stand, said sliding block having a fork projecting laterally therefrom to a position under a cradle plate and lifting it, and drive means coupled to said slide stand and sliding block to lift the cradle in order to effect the clasping of a lap by the carrier, said drive means having actuating means actuated by a carrier approaching the point above the lifting apparatus without a lap therein.

5. An apparatus as claimed in claim 1 wherein said pair of hooked arms are provided on each of said carriers for pivotal movement toward and away from each other for clasping the lap by applying an externally downward force on the hooked arms, and biased rotatable levers engaging the arms adjacent the pivot point for holding the arms in the clasping position, said pair of hooked arms being biased to the open position so they are opened by rotating the biased levers to release the lap therefrom.

References Cited

UNITED STATES PATENTS 2,037,348  4/1936  Stein _____________ 242—55.1

FOREIGN PATENTS 1,372,080  8/1964  France.
239,732  2/1946  Switzerland.

DORSEY NEWTON, *Primary Examiner.*